United States Patent

Baik et al.

[11] Patent Number: 5,912,397
[45] Date of Patent: Jun. 15, 1999

[54] HIGH-PURITY SILICA GLASS FABRICATING METHOD USING SOL-GEL PROCESS

[75] Inventors: Young-Min Baik; Young-Sik Yoon, both of Kumi; Sun-Uk Kim; Myung-Chul Jun, both of Pohang, all of Rep. of Korea

[73] Assignee: SamSung Electronics Co., Ltd., Suwon, Rep. of Korea

[21] Appl. No.: 09/037,520

[22] Filed: Mar. 10, 1998

[30] Foreign Application Priority Data

Mar. 10, 1997 [KR] Rep. of Korea .................. 97-7974

[51] Int. Cl.$^6$ ........................................... C03B 8/02
[52] U.S. Cl. .................................. 65/17.2; 65/395
[58] Field of Search ................ 65/395, 396, 17.2

[56] References Cited

U.S. PATENT DOCUMENTS

| | | | |
|---|---|---|---|
| 4,419,115 | 12/1983 | Johnson, Jr. et al. | 65/395 |
| 4,605,428 | 8/1986 | Johnson, Jr. et al. | 65/395 |
| 4,680,046 | 7/1987 | Matsuo et al. | 65/395 |
| 4,680,048 | 7/1987 | Motoki et al. | 65/17.2 |
| 4,681,615 | 7/1987 | Toki et al. | 65/396 |
| 5,250,096 | 10/1993 | Bruce et al. | 65/395 |
| 5,254,508 | 10/1993 | Kirkbir et al. | 65/395 |

*Primary Examiner*—Stanley S. Silverman
*Assistant Examiner*—Sean Vincent
*Attorney, Agent, or Firm*—Robert E. Bushnell, Esq.

[57] ABSTRACT

There is provided a high-purity silica glass fabricating method using a sol-gel process. In the method, a first sol is formed by mixing 100 parts by weight of fumed silica powder with between 100 to 300 parts by weight of deionized water. The first sol is gelled, dried, powdered, and thermally treated. A second sol is formed by mixing the thermally-treated first sol with between 100 to 200 parts by weight of deionized water and 20 to 50 parts by weight of non-thermally treated original fumed silica powder. The second sol is gelled, dried, and sintered. Thus, a high-purity silica glass is formed.

8 Claims, 4 Drawing Sheets

HIGH-PURITY SILICA GLASS FABRICATING METHOD USING SOL-GEL PROCESS

CLAIM FOR PRIORITY

This application makes reference to, incorporates the same here and claims all benefits accruing under 35 U.S.C. §119 from applications for HIGH-PURITY SILICA GLASS FABRICATING METHOD USING SOL-GEL PROCESS earlier filed in the Korean Industrial Property Office on the 10$^{th}$ day of March 1997, and there duly assigned Ser. No. 1997/7974.

BACKGROUND OF THE INVENTION

1. Field of the Invention

The present invention relates to sol-gel processes generally, and, more particularly, to a technique for fabricating a silica glass tube containing high-purity, high-density silica, while using a sol-gel process.

2. Description of the Related Art

In general, many methods have been suggested for the manufacture of high-silica content glass articles, such as the single and double dispersion processes described by D. W. Johnson, et alii in *Fabrication Of Sintered High-Silica Glasses,* U.S. Pat. No. 4,419,115, and the process described by D. W. Johnson, et alii in *Sintered High-Silica Glass And Articles Comprising Same,* U.S. Pat. No. 4,605,428. Uses of high-silica content include the fabrication of glass rods for use as preforms in the manufacture of optical fibers as suggested by F. Kirkbir, et alii, U.S. Pat. No. 5,254,508 for a *Sol-gel Process For Forming A Germania-doped Silica Glass Rod,* and the fabrication of secondary cladding tubes for use during fabrication of an optical fiber by a sol-gel process. Silica glass obtained by using only fumed silica powder is vulnerable to cracking during drying because of the presence of very fine pores that have been created among the particles during the process; consequently the process can not be broadly used. Although sol-gel processes enable fabrication of glass objects at a significantly lower cost than other processes, N. Matsuo, et alii, in U.S. Pat. No. 4,680,046 for a *Method Of Preparing Preforms For Optical Fibers,* among others, has noted that it is difficult to provide a glass article that is large enough to be used as a preform for optical fibers. A sol-gel process using silicon alkoxide assures chemical purity while accommodating flexibility in the selection of compositions, to provide homogeneous and transparent glass bodies. These glass bodies tend however, to exhibit an unacceptably high shrinkage rate (i.e., higher than 60%), which makes it difficult to use the glass body when a long secondary cladding tube (i.e., longer than 90 centimeters) is needed for example, the fabrication of an optical fiber.

In these conventional processes for fabrication of silica glass tubes from fumed silica particles, a first sol is formed by dispersing fine fumed silica particles in water in an effort to prevent cracking. Then, the first sol is gelled and dried. Silica powder is obtained by grinding and classifying the dried first sol. Then, a second sol is formed by thermally treating the silica powder and re-dispersing the thermally treated silica powder in water. The secondary sol is gelled, dried, and sintered. This process has, unfortunately, been found to remarkably decrease the packing rate of the powder and is therefore generally unsuitable for reducing the shrinkage rate during the drying process because the silica glass tube has been fabricated by dispersing, gelling, drying, powdering, thermally treating, re-dispersing, re-gelling, drying, and sintering the fumed silica. In essence, processes such as these simply re-disperse in water a power of silica obtained from a first gel, in order to form the second sol, a technique found, for example, in the *Sol-gel Method Of Making Multicomponent Glass,* U.S. Pat. No. 5,250,096 by A. J. Bruce, et alii. Moreover, as noted by Bruce '096, typically glass bodies produced by these processes need to be further processed.

SUMMARY OF THE INVENTION

It is an object of the present invention to provide an improved process for manufacturing silica glass.

It is another object to provide a process for fabrication of longer glass objects.

It is still another object to provide a sol-gel process able to minimize the shrinkage of glass objects during fabrication.

It is yet another object to provide a process for using original fumed silica power in the manufacture of high-density, high-purity silica glass.

It is still yet another object to provide a process for fabricating silica glass exhibiting high density and high purity by adding original fumed silica powder during a secondary sol formation process.

It is a further object to provide a process for fabricating silica glass exhibiting high density and high purity by adding original fumed silica powder during a secondary sol formation process and then performing a second gelation process.

It is a still further object to provide a high-purity silica glass fabricating process able to minimize cracking of a dried silica gel tube while increasing the packing rate by increasing the size of pores among silica particles.

These and other objects may be attained according to the principles of the present invention with a high-purity silica glass fabrication technique using a sol-gel process. A first sol may be formed by mixing approximately one hundred parts by weight of fumed silica powder with between approximately one hundred and three hundred parts by weight of deionized water. The first sol may be gelled, dried, powdered, and thermally treated. A second sol may then be formed by mixing the thermally-treated first sol with between approximately one hundred and two hundred parts by weight of deionized water and between approximately twenty and fifty parts by weight of non-thermally treated original fumed silica powder. The second sol may then be gelled, dried, and sintered. Thus, a high-purity silica glass is formed.

BRIEF DESCRIPTION OF THE DRAWINGS

A more complete appreciation of this invention, and many of the attendant advantages thereof will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
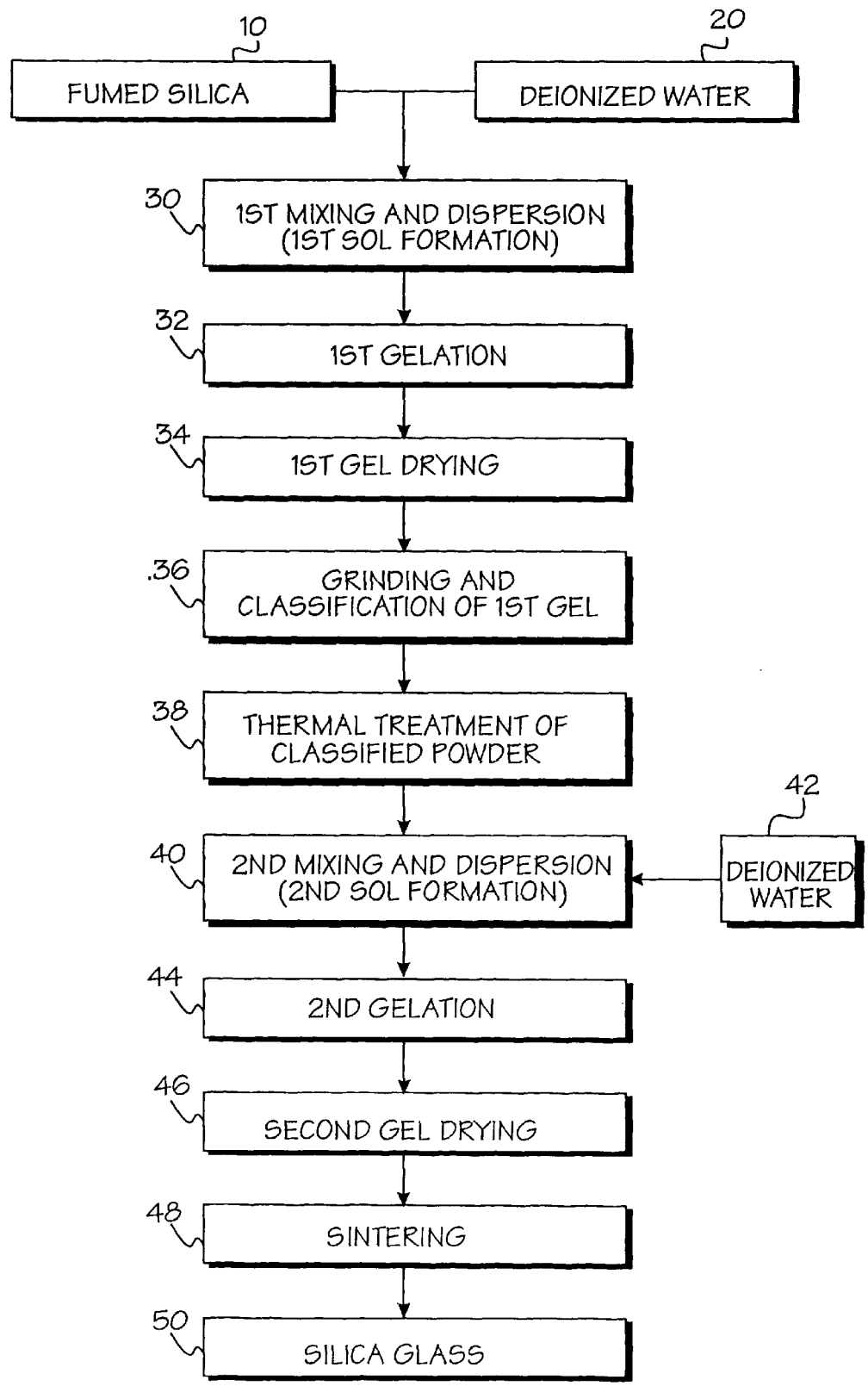
FIG. 1 is a flowchart of a conventional process for fabricating a silica glass using a sol-gel process.

As shown in FIG. 1, in a typical conventional process for fabricating a silica glass tube out of fumed silica particles, a first sol is formed by mixing fine fumed silica particles 10 in deionized water 20 to create a dispersion 30 (ie., the first solution) in an attempt to prevent cracking. By way of explanation, a sol is a fluid colloidal system such as a dispersion of solid particles (e.g. fumed silica particles in a liquid colloidal solution while a gel is a colloid in a more solid form than a sol, that is, a more or less rigid system that is formed by coagulation of a sol in various ways. Then, the first sol is then gelled in step 32 and dried in step 34. Silica powder is obtained in step 36 by grinding and classifying the dried first sol. Then, a second sol is formed by thermally treating the silica powder in step 38 and, in step 40, re-dispersing the thermally treated silica powder deionized in water 42. The secondary sol is gelled in a second gellation step 44, and dried in step 46. This gel is then sintered in step 48 to provide silica glass 50. We have found that while this process remarkably decreases the packing rate in the powder it has limited value in reducing the shrinkage rate during the drying process because silica glass tubes are fabricated in this process by sequentially dispersing, gelling, drying, powdering and thermally treating, followed by a simple repetition of the earlier steps of the process by re-dispersing, re-gelling, and drying the gel, and then sintering the glass produced.

Figure 2:
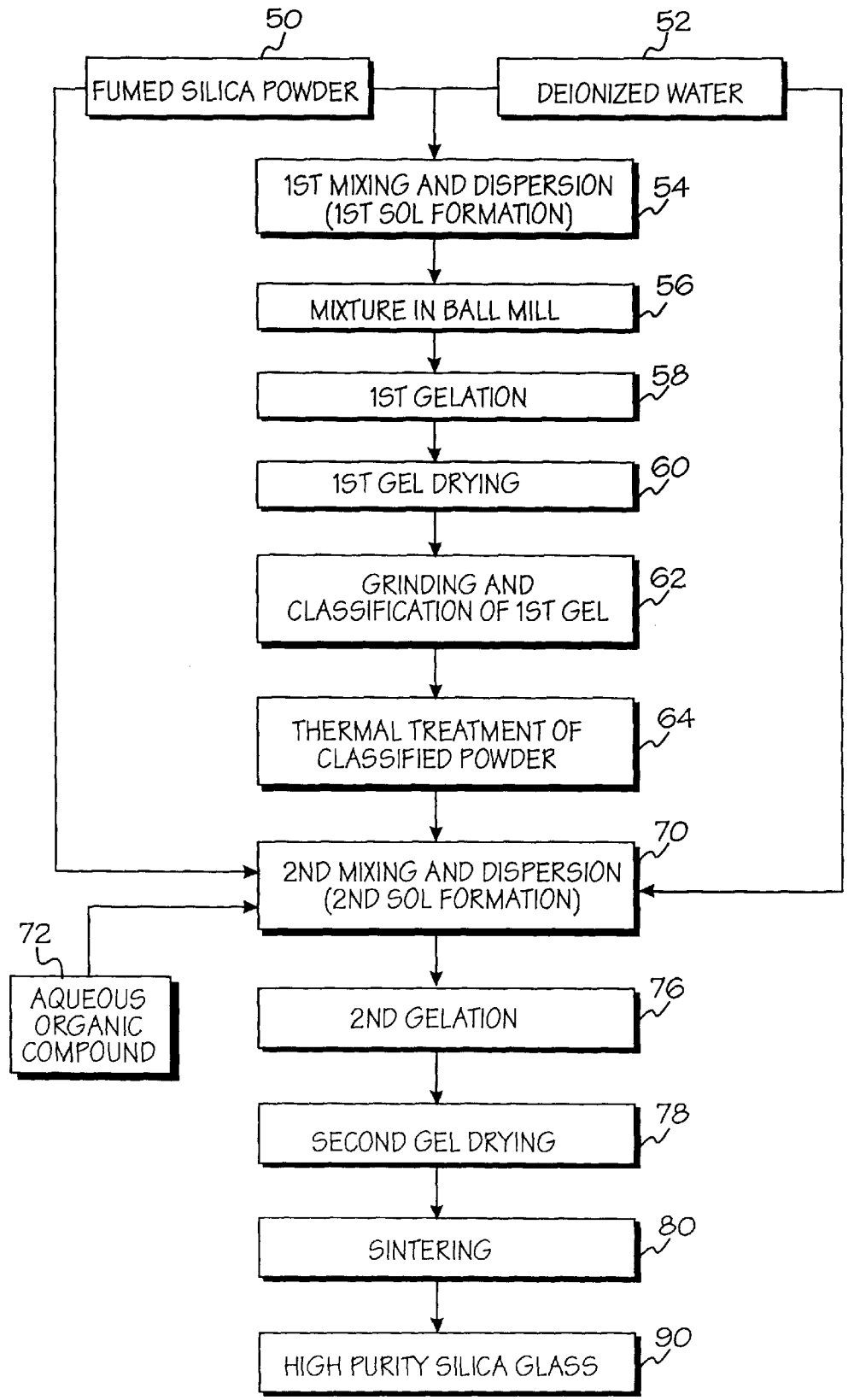
FIG. 2 is a flowchart of a process for fabricating a high-purity silica glass using the sol-gel technique according to the principles of the present invention.

Turning now to FIG. 2, we have found that high-purity silica glass may be fabricated according to the principles of the present invention with preferably approximately seven to forty namometer (7–40 nm) fumed silica powder containing high-density silica may be mixed with distilled deionized water 52 at a weight ratio of 1:1–1:3 in a high shear mixer in step 54, and then a first homogeneous mixed sol is formed by a ball mill in step 56. High-purity silica glass is sometimes defined as at least 85 mole percent silicon oxide ($SiO_2$). The first sol is gelled in step 58 and dried in step 60 for a predetermined time. The dried first sol becomes powder through grinding and classification in step 62. Powder particles are grown in step 64, while being coagulated, by thermally treating the powder for between about 0.5 to 4 hours at a temperature of about 600° C. or higher.

A second sol is then formed by re-dispersing the grown particles produced in step 64 in the same manner for the first sol. During formation of the second sol, 20–50 per cent by weight of original fumed silica powder 50 based on the weight of the thermally treated silica powder (produced in step 64) is added to and mixed with the grown powder produced in step 64 to fill pores among the grown particles in step 70. At this time, an aqueous organic compound 72 such as polyvinyl alcohol is preferably added at an appropriate amount to the mixture in order to prevent cracking. Then, the second sol is poured into a mold of an intended shape (e.g., tube), gelled while in the mold during step 76, and dried for a predetermined time during step 78. The drying during step 78 removes moisture (and a hydroxyl-group) from the dried gel at about 600–1000° C., by chlorinating the dried gel matrix; that is, by exposing the matrix to chlorine gas. The remaining chlorine is removed from the matrix by purging the matrix with helium gas. Then, the dried second sol is sintered, preferably to a transparent glass, during step 80 at a temperature of between 1350° C. and a glass fusion point. Thus, a high-purity silica glass 90 is fabricated.

This process of fabricating high-purity silica glass according to the principles of the present invention will be described referring to an embodiment in the best mode, in the following paragraphs.

Embodiment 1

A first sol containing about twenty-five percent by weight of silica is formed by mixing 2000 grams of fumed silica powder having a specific surface area 50 $m^2/g$ with 6000 grams of deionized water. To obtain a homogeneous first sol, the mixing process is performed in a ball mill at about 90 rpm for about twenty-four hours by adding 16 kilograms of silica balls having a diameter of 10 mm. Then, the first sol is gelled, and moisture is vaporized from the gel at 120° C. for about twenty-four hours in a drier. The dried silica is ground, classified by a mesh sieve, and thermally treated at 1100° C. for one hour in a heat treatment furnace having a temperature rising speed of 300° C./hour. A second sol is then formulated as the thermally treated powder is blended with water at a weight ratio of 1:1.2 for about fifteen minutes, and mixed with an additional 20 grams of polyvinyl alcohol for about twenty-four hours in the ball mill under the same condition for forming the first sol. Then, the thus-formed second sol is mixed with 400 grams of non-thermally treated fumed silica powder, 400 grams of deionized water, and 4.8 grams of ammonium fluoride for about six hours in the ball mill. The sol is poured into a mold and gelled for about twenty-four hours. Here, the mold is formed of teflon and divided into an upper portion, a lower portion, a tube-shaped outer portion, and a central rod. The dimensions of an object moldable by the mold are about 35 nm in inner diameter, 71 nm in outer diameter, and 1.3 meters in length. Then, the central rod is removed and the sol in the mold is dried for approximately two to three days at room temperature and a relative humidity of about 80%. Then, the mold is removed and the tube-shaped gel is dried for about ten days at a relative humidity of 80%. The tube-shaped gel is dried for about twenty-four hours at 30° C., for about twenty-four hours at about 40° C., and then for about twenty-four hours at 50° C. Then, remaining moisture and an organic material are removed from the dried gel by heating the gel for about five hours at about 900° C. in a heat treatment furnace having a temperature rising speed of about 100° C./hour. Subsequently, a high-purity silica glass tube is formed by classifying the thermally treated gel at an atmosphere of helium and chlorine gases in a furnace. Here, dehydroxylation and classification are performed at a temperature between approximately 600–1000° C. for about five hours and at about 1400° C. for about one hour, respectively.

Figure 3:
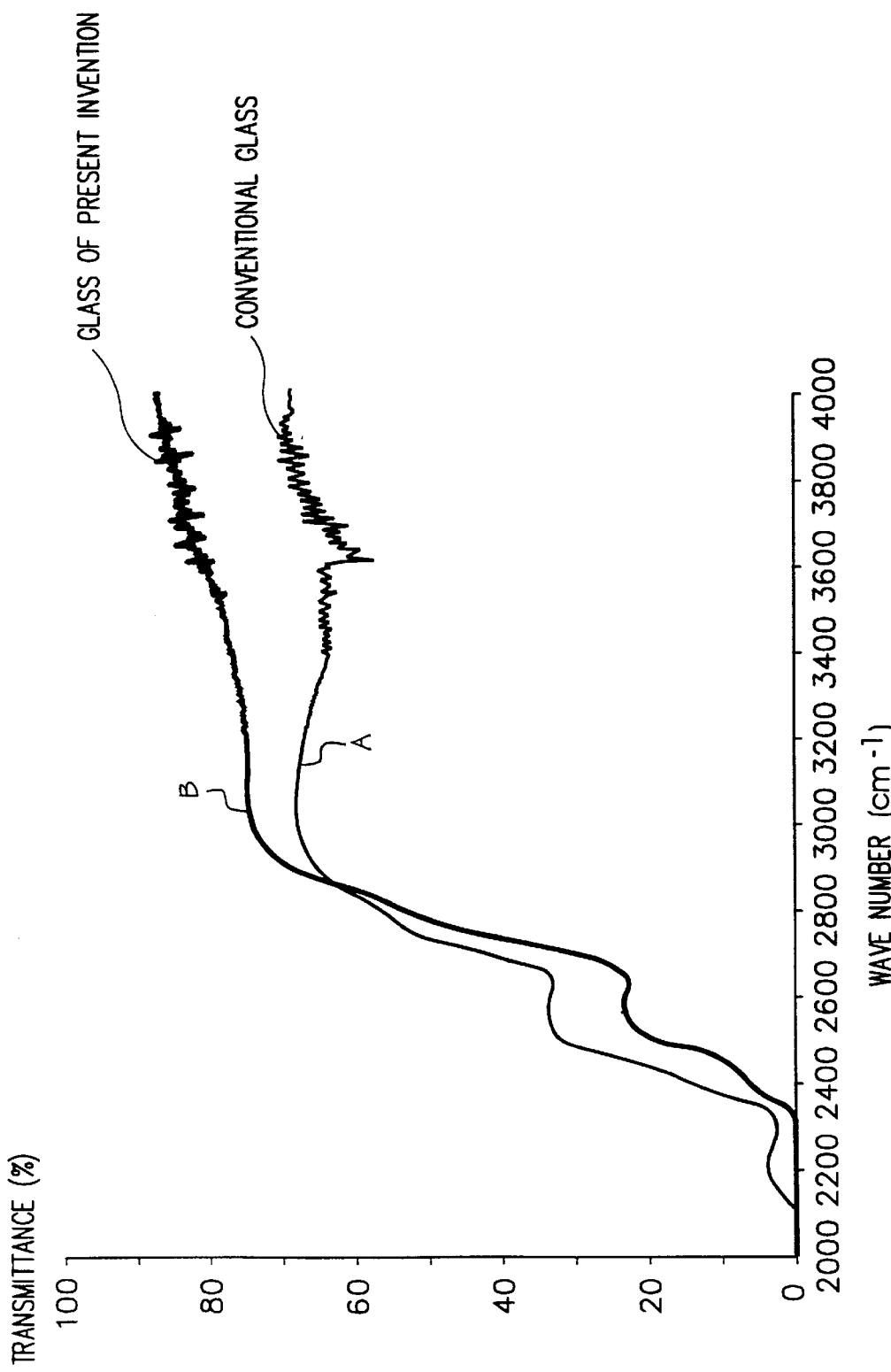
FIG. 3 is a graph showing the far infrared spectra of the high-purity silica glass according the embodiment of the present invention.

Therefore, the infrared (IR) transmittance of the high-purity glass fabricated by this process at a wave number of 3400 $cm^{-1}$ or above, is represented by measurements plotted along curve B being substantially higher than that of a conventional silica glass, as is shown by the measurements made along curve A shown in FIG. 3. From the result, it is noted that the silica glass fabricated according to the principles of the present invention is more transparent and has a lower OH content than silica glass produced by a conventional process.

EXAMPLE 1

For comparison, a silica glass tube was fabricated in the same shape as a comparative example in the same manner for embodiment 1, except that original silica powder was not added during formation of the second sol. The shrinkage rates of comparative example 1 and embodiment 1 are measured as follows:

| compar-<br>ative<br>example 1 | sol size<br>70 mm | dried gel size<br>61 mm<br>shrinkage rate:<br>12.9% | size of final sintered body<br>46 mm<br>shrinkage rate: 24.6% |
|---|---|---|---|
| | total shrinkage rate of final sintered body from first sol: 34.2% | | |
| embodi-<br>ment 1 | sol size<br>70 mm | dried gel size<br>63 mm<br>shrinkage rate:<br>10.0% | size of final sintered body<br>48 mm<br>shrinkage rate: 23.8% |
| | total shrinkage rate of final sintered body from first sol: 31.4% | | |

The glass tube of the present invention may be used as a secondary cladding tube for fabrication of an optical fiber, or for other glass products, for example, optical lenses, can be fabricated in the same method by using different molds.

Embodiment 2

Figure 4:
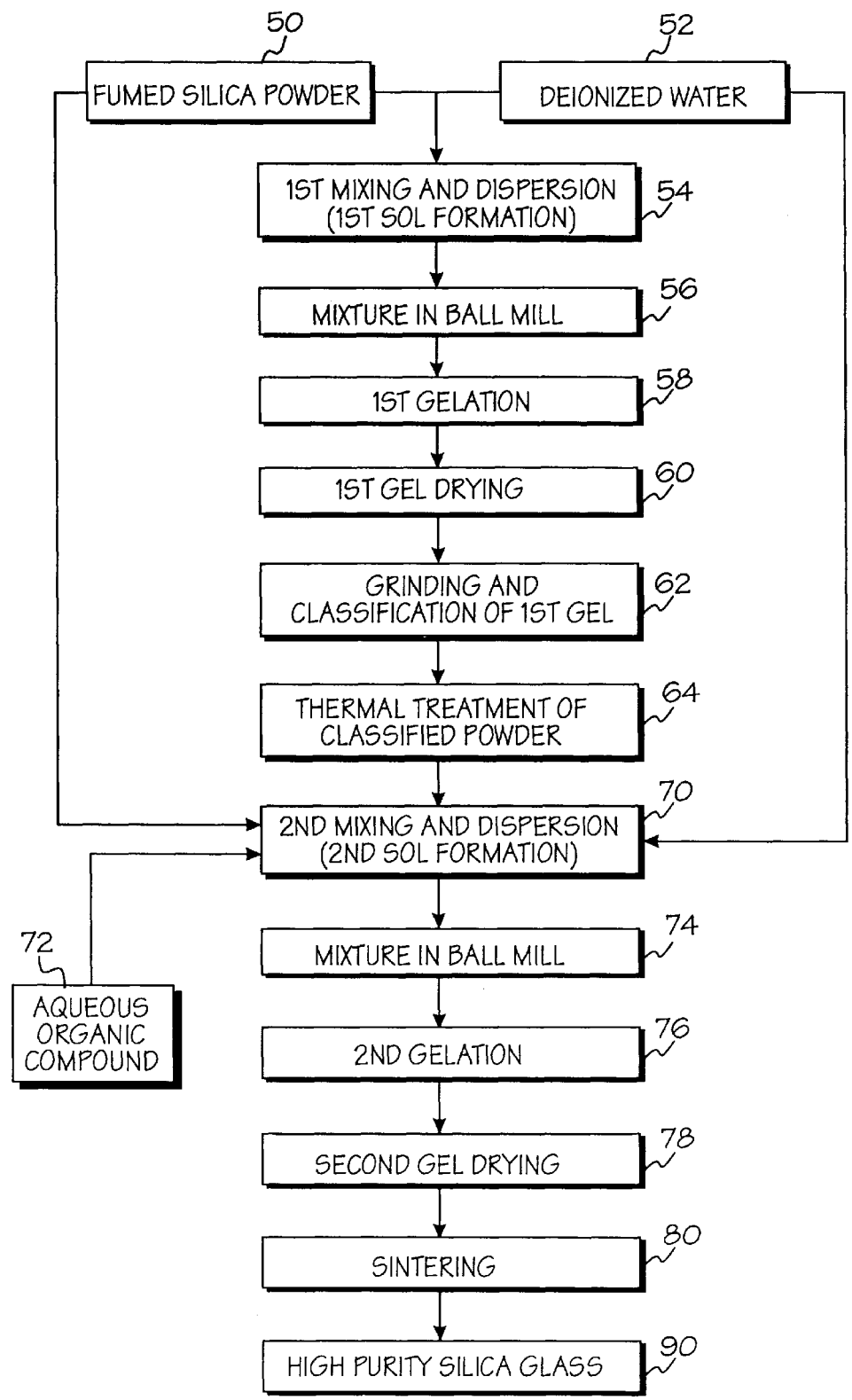
FIG. 4 is a flowchart of an alternative process for fabricating a high-purity silica glass using the sol-gel technique according to the principles of the present invention.

In the first embodiment, the thermally-treated powder is mixed with water at a weight ratio of 1:1.2, blended for about fifteen minutes, and mixed with additional 20 grams of polyvinyl alcohol in the ball mill for formation of the second sol as shown in FIG. 2. FIG. 4 represents a modification of the process represented by FIG. 2, for formation of the second sol as a second embodiment produced by the process of the present invention. The thermally-treated power produced by step 64 is mixed with water at a weight ratio of 1:1.2, blended for about fifteen minutes, mixed in step 74 with additional 16 kilograms of silica balls having a diameter of 10 mm for about twenty-four hours at about 90 rpm in the ball mill and then mixed with additional 20 grams of polyvinyl alcohol in the ball mill. The subsequent steps of molding, the second gelation, drying and sintering are performed in the same manner as those in the first embodiment. Thus, an excellent high-purity silica glass can be fabricated.

Embodiment 3

For formation of the second sol using the process represented by FIG. 4 in a third embodiment, the thermally-treated powder is mixed with water at a weight ratio of 1:1.2, blended for about fifteen minutes, and mixed with about twenty grams of polyvinyl alcohol, 400 grams of fumed silica powder, 400 grams of deionized water, and 4.8 grams of ammonium fluoride. Then, the resultant mixture is mixed with additional approximately sixteen kilograms of silica balls having a diameter of 10 mm at 90 rpm for about twenty-four hours in the ball mill, thereby obviating the need for a third ball mill step.

EXAMPLE 2

A high-purity silica glass object was fabricated by forming a first homogeneous mixed sol by mixing fumed silica powder with distilled deionized water at a weight ratio of between 1:1–1:3, and mixing the mixture with 16 kg of silica balls having a diameter of 10 mm at about ninety revolutions per minute for about twenty-four hours in a ball mill; forming a first gel by gelling the first sol; drying the first gel at 120° C. for about twenty-four hours in a drier; and forming powder out of the dried silica by grinding the dried silica and classifying the ground silica by a 20 mesh sieve. The powder was thermally treated in the range between 600° C. and 1100° C. for one hour in a heat treatment furnace having a temperature rising speed of 300° C./hr; the thermally-treated powder was mixed with water at a weight ratio of 1:1.2, and the mixture was blended for about fifteen minutes, and mixed with about twenty grams of polyvinyl alcohol and 16 kg of silica balls having a diameter of 10 mm at about ninety revolutions per minute for about twenty-four hours in the ball mill. A second sol was formed by mixing the resultant mixture with 400 grams of fumed silica powder, 400 grams of deionized water, and 4.8 grams of ammonium fluoride for about six hours in the ball mill; and a tube-shaped gel was formed by pouring the second sol in a mold, gelling the sol for about forty-eight hours, drying the gel at a relative humidity of approximately 80% for between approximately two to three days at about 25° C., and then removing the mold from the sol. The tube-shaped gel was dried at a relative humidity of 80% for about 10 days, at 30° C. for about twenty-four hours, at about 40° C. for about twenty-four hours, and then at 50° C. for about twenty-four hours, and remaining moisture and organic material was removed from the dried gel at 900° C. for about five hours in a heat treatment furnace having a temperature rising speed of 100° C./hr. Then, remaining moisture was removed from the dried gel between about 600° C. and 1100° C., using chlorine gas, and residual chlorine was removed from the gel, using helium gas. The gel was sintered between 1300° C. and a glass fusion point.

EXAMPLE 3

A high-purity silica glass object was fabricated with a sol-gel process by forming a first homogeneous mixed sol by mixing fumed silica powder with distilled deionized water at a weight ratio of between 1:1–1:3, and mixing the mixture with 16 kilograms of silica balls having a diameter of 10 mm at about ninety revolutions per minute for about twenty-four hours in a ball mill. A first gel was formed by gelling the first sol; the first gel was dried at 120° C. for about twenty-four hours in a drier; a powder was formed from the dried silica by grinding the dried silica and classifying the ground silica by a 20 mesh sieve; and the powder was thermally treated at a temperature in the range between 600° C. and 1100° C. for about one hour in a heat treatment furnace having a temperature rising speed of 300° C. per hour. The thermally-treated powder was mixed with water at a weight ratio of 1:1.2, the mixture was blended for about fifteen minutes, the mixture was mixed with about sixteen kilograms of silica balls having a diameter of 10 mm at about ninety revolutions per minute for about twenty-four hours in the ball mill, and about 20 grams of polyvinyl alcohol was added to the mixture. A second sol was formed by mixing the resultant mixture containing the polyvinyl alcohol with 400 grams of fumed silica powder, 400 grams of deionized water, and 4.8 grams of ammonium fluoride for about six hours in the ball mill. A tube-shaped gel was formed by pouring the second sol in a mold, gelling the sol for about forty-eight hours, drying the gel at a relative humidity of 80% for about twenty-three days, and removing the mold from the sol. The tube-shaped gel was dried at a relative humidity of 80% for about ten days, at 30° C. for twenty-four hours, at 40° C. for about twenty-four hours, and then at 50° C. for about twenty-four hours, and moisture and organic material was removed from the dried tube-shaped gel at 900° C. for about five hours in a heat treatment furnace having a temperature rising speed of 100° C./hour; and residual moisture was removed from the dried gel between 600° C. and 1100° C., using chlorine gas, chlorine was removed from the gel using helium gas, and the gel was sintered at a temperature of between approximately 1300° C. and the glass fusion point of the silica glass.

EXAMPLE 4

Another high-purity silica glass object was fabricated with this sol-gel process by forming a homogeneous first mixture by mixing fumed silica powder with distilled deionized water at a weight ratio of between 1:1–1:3, and forming a first sol by mixing the first mixture with 16 kg of silica balls having a diameter of 10 mm at about ninety revolutions per minute for about twenty-four hours in a ball mill. A first gel was formed by gelling the first sol; the first gel was dried at 120° C. for about twenty-four hours; a powder was formed from the dried silica by grinding the dried silica to produce ground silica, and the ground silica was classified with a 20 mesh sieve to provide the powder. The powder was thermally treated at a temperature in the range between 600° C. and 1100° C. for one hour in a heat treatment furnace having a temperature rising speed of 300° C./hr; the thermally-treated powder was mixed with water at a weight ratio of 1:1.2 to provide a second mixture, and the second mixture was blended for about fifteen minutes. A second sol was formed from a resultant mixture made by mixing the second mixture with about 20 grams of polyvinyl alcohol, 400 grams of fumed silica powder, 400 grams of deionized water, and 4.8 grams of ammonium fluoride, and the resultant mixture was mixed with 16 kilograms of silica balls having a diameter of 10 mm at about ninety revolutions per minute for about twenty-four hours in the ball mill. A tube-shaped gel was then formed by pouring the second sol into a mold, gelling the second sol for about forty-eight hours, drying the gel at a relative humidity of about 80% for between two and three days, and removing the mold from the second sol.

Various values (e.g., weight ratio, weight, temperature, and length) described in the embodiments of the present invention are exemplary, and thus can be varied.

As described above, the process for fabricating high-purity silica glass using the sol-gel according to the principles of the present invention are advantageous because silica glass tubes produced by the present invention may be fabricated at a lower cost with a lower OH content, a higher purity, and a comparable or more excellent quality than conventional synthetic glass tubes. When the silica glass tube is used for fabrication of an optical fiber, a very cheap, high-purity optical fiber can be obtained. Moreover, cracking is prevented and a packing rate is increased by mixing a first thermally heated powder with original fumed silica powder at an appropriate ratio, heating the mixture, and thus increasing the size of pores after particle growing, thereby removing additional cracking causes.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A high-purity silica glass fabrication process, comprising the steps of:
   forming a first sol by mixing approximately 100 parts by weight of fumed silica powder with between approximately 100 and 300 parts by weight of deionized water;
   gelling, drying, powdering, and thermally treating the first sol;
   forming a second sol by mixing the thermally-treated first sol with between approximately 100 and 200 parts by weight of deionized water and between approximately 20 and 50 parts by weight of fumed silica powder; and
   gelling, drying, and sintering the second sol to thereby form a high-purity silica glass.

2. The process of claim 1, further comprised of filling a mold having a tube shape with the second sol prior to said gelling, drying, and sintering of the second sol.

3. A high-purity silica glass fabrication process, comprising the steps of:
   forming a first homogeneous mixed sol by mixing fumed silica powder wit distilled
   drying the first gel at a predetermined temperature for a predetermined time in a drier;
   converting the first gel into a powder of dried silica by grinding, and classifying the dried silica powder;
   thermally treating the powder at a predetermined temperature for predetermined time;
   mixing the thermally-treated powder with water at a predetermined weight ratio to form an intermediate mixture, blending the mixture for a predetermined time, and forming a resultant mixture by mixing the mixture with a predetermined amount of polyvinyl alcohol in the ball mill;
   forming a second sol by mixing the resultant mixture with fumed silica powder, deionized water, and ammonium fluoride in the ball mill;
   forming a tube-shaped gel by pouring the second sol into a mold, drying the second sol for predetermined time, and removing the mold from the second sol;
   drying the tube-shaped gel at room temperature; and
   removing remaining moisture and chlorine from the dried tube-shaped gel at a predetermined temperature using chlorine and helium gases, and sintering the gel at a high temperature at or below glass fusion point.

4. A high-purity silica glass fabricating method using a sol-gel process, comprising the steps of:
   forming a mixed homogeneous first sol by mixing fumed silica powder with distilled deionized water at a weight ratio of between 1:1–1:3, and mixing the first sol with 16 kilograms of silica balls having a diameter of 10 mm at about ninety revolutions per minute for about twenty-four deionized water at a weight ratio of between 1:1–1:3, and nixing the first sol with 16 kilograms of silica balls having a diameter of 10 mm at about ninety revolutions per minute for about twenty-four hours in a ball mill;
   forming a first gel by gelling the first sol;
   producing dried silica by drying the first gel at 120° C. for about twenty-four hours in a drier;
   forming powder from the dried silica by grinding the dried silica to produce ground silica and classifying the ground silica with a 20 mesh sieve to provide the powder;
   thermally treating the powder at a temperature in the range between 600° C. and 1100° C. for about one hour in a heat treatment furnace having a temperature rising speed of 300° C./hr;
   forming an intermediate mixture by mixing the thermally-treated powder with water at a weight ratio of 1:1.2, blending the intermediate mixture for about fifteen minutes, and mixing the intermediate mixture wit twenty grams of polyvinyl alcohol and sixteen kilograms of silica balls having a diameter of 10 mm at about ninety revolutions per minute for about twenty-four hours in the ball mill;
   for a second sol by mixing the resultant mixture with 400 grams of fumed silica powder, 400 grams of deionized water, and 4.8 grams of ammonium fluoride for about six hours in the ball mill;

forming a tube-shaped gel by pouring the second sol into a mold, gelling the second sol for about forty-eight hours, drying the tube-shaped gel at a relative humidity of about 80% for between two to three days at about 25° C., and removing the mold from the second sol;

producing a dried gel by drying the tube-shaped gel at a relative humidity of 80% for about ten days, at about 30° C. for twenty-four hours, at about 40° C. for about twenty-four hours, and then at about 50° C. for about twenty-four hours, and removing remaining moisture and organic material from the dried gel at about 900° C. for about five hours in a heat treatment furnace having a temperature rising speed of 100° C./hr; and removing residual moisture from the dried gel between about 600° C. and 1100° C., using chlorine gas, removing remaining chlorine from the dried gel using helium gas, and sintering the dried gel between 1300° C. and the glass fusion point.

5. A high-purity silica glass fabricating method using a sol-gel process, comprising the steps of:

forming a first homogeneous mixed sol by mixing fumed silica powder with distilled deionized water at a predetermined weight in a ball mill;

forming a first gel by gelling the first sol;

converting the first gel into dried silica by drying the first gel at a predetermined temperature for a predetermined time in a drier;

forming powder from the dried silica by grinding and classifying the dried silica;

thermally treating the powder at a predetermined temperature for a predetermined time;

forming a mixture by mixing the thermally-treated powder with water at a predetermined weight ratio, blending the mixture for a predetermined time, mixing the mixture in the ball mill and providing a resultant mixture by adding a predetermined amount of polyvinyl alcohol to the mixture;

forming a second sol by mixing the resultant mixture containing the polyvinyl alcohol with fumed silica powder, deionized water, and ammonium fluoride in the ball mill;

forming a tube-shaped gel by pouring the second sol in a mold, drying the second sol for a predetermined time, and removing the mold from the second sol;

drying the tube-shaped gel by pouring the second sol in a mold, drying the second sol for a predetermined time, and removing the mold from the second sol; drying the tube-shaped gel at room temperature; and removing moisture and chlorine from the dried tube-shaped gel at a predetermined temperature by using chlorine and helium gases, and sintering the dried tube-shaped gel at a high temperature equal to or less than a glass fusion point.

6. A high-purity silica glass fabricating method using a sol-gel process, comprising the steps of:

forming a homogeneous mixed first sol by mixing fumed silica powder with distilled deionized water at a weight ratio of between 1:1–1:3, and mixing the first sol with 16 kilograms of silica balls having a diameter of 10 mm at about ninety revolutions per minute for about twenty-four hours in a ball mill;

forming a first gel by gelling the first sol;

producing dried silica by drying the first gel at 120° C. for about twenty-four hours in a drier;

forming powder from the dried silica by grinding the dried silica to produce ground silica and classifying the ground silica with a 20 mesh sieve to provide the powder;

thermally treating the powder in the range between 600° C. and 1100° C. for about one hour in a heat treatment furnace having a temperature rising speed of 300° C./hr;

forming an intermediate mixture by mixing the thermally-treated powder with water at a weight ratio of between 1:1.2, blending the mixture for about fifteen minutes, mixing the intermediate mixture with 16 kilograms of silica balls having a diameter of 10 mm at about ninety revolutions per minute for about twenty-four hours in the ball mill, and providing a resultant mixture by adding 20 grams of polyvinyl alcohol to the intermediate mixture;

forming a second sol by mixing the resultant mixture containing the polyvinyl alcohol with 400 grams of fumed silica powder, 400 grams of deionized water, and 4.8 grams of ammonium fluoride for about six hours in the ball mill;

forming a tube-shaped gel by pouring the second sol into a mold, gelling the second sol for about forty-eight hours, drying the tube-shaped gel at a relative humidity of 80% for about twenty-three days, and removing the mold from the second sol;

producing a dried gel by drying the tube-shaped gel at a relative humidity of 80% for about ten days, at 30° C. for twenty-four hours, at 40° C. for about twenty-four hours, and then at 50° C. for about twenty-four hours, and removing remaining moisture and organic material from the dried tube-shaped gel at 900° C. for about five hours in a heat treatment furnace having a temperature rising speed of 100° C./hr; and removing residual moisture from the dried gel between 600° C. and 1100° C., using chlorine gas, removing residual chlorine from the gel using helium gas, and sintering the gel between 1300° C. and a glass fusion point.

7. A high-purity silica glass fabricating method using a sol-gel process, comprising the steps of:

forming a homogeneous mixed first sol by mixing fumed silica powder with distilled deionized water at a predetermined weight ratio in a ball mill;

forming a first gel by gelling the first sol; producing dried silica by drying the first gel at a predetermined temperature for a predetermined time in a drier;

forming powder from the dried silica by grinding and classifying the dried silica;

thermally treating the powder at a predetermined temperature for a predetermined time;

forming a mixture by mixing the thermally-treated powder with water at a predetermined weight ratio, and blending the mixture for a predetermined time;

forming a second sol by mixing the mixture with a predetermined amount of polyvinyl alcohol, fumed silica powder, deionized water, and ammonium fluoride in the ball mill;

forming a tube-shaped gel by pouring the second sol into a mold, drying the second sol for a predetermined time, and removing the mold from the second sol;

drying the tube-shaped gel at room temperature to provide a dried gel; and removing the remaining moisture and chlorine from the dried tube-shaped gel at a predetermined temperature using chlorine and helium gases, and sintering the dried tube-shaped gel at a high temperature equal to or less than a glass fusion point.

8. A high-purity silica glass fabricating method using a sol-gel process, comprising the steps of:

forming a homogeneous first mixture by mixing finned silica powder with distilled deionized water at a weight ratio of between 1:1–1:3, and forming a first sol by mixing the first mixture with 16 kg of silica balls having a diameter of 10 mm at about ninety revolutions per minute for about twenty-four hours in a ball mill;

forming a first gel by gelling the first sol;

drying the first gel at 120° C. for about twenty-four hours in a drier to produce dried silica;

forming powder from the dried silica by grinding the dried silica to produce ground silica, and classifying the ground silica with a 20 mesh sieve to provide the powder;

thermally treating the powder at a temperature in the range between 600° C. and 1100° C. for one hour in a heat treatment furnace having a temperature rising speed of 300° C./hr;

mixing the thermally-treated powder with water at a weight ratio of 1:1.2 to provide a second mixture, and blending the second mixture for about fifteen minutes;

forming a second sol from a resultant mixture made by mixing the second mixture with about 20 grams of polyvinyl alcohol 400 grams of fumed silica powder, 400 grams of deionized water, and 4.8 grams of ammonium fluoride, and mixing the resultant mixture with 16 kilograms of silica balls having a diameter of 10 mm at about ninety revolutions per minute for about twenty-four hours in the ball mill;

forming a tube-shaped gel by pouring the second sol into a mold, gelling the second sol for about forty-eight hours, drying the gel at a relative humidity of about 80% for between two and three days at about 25° C., and removing the mold from the second sol;

drying the tube-shaped gel at a relative humidity of about 80% for about ten days, at about 30° C. for about twenty-four hours, at about 40° C. for about twenty-four hours, and then at about 50° C. for about twenty-four hours, and removing remaining moisture and organic material from the dried tube-shaped gel at about 900° C. for about five hours in a heat treatment furnace having a temperature rising speed of 100° C./hr; and removing residual moisture from the dried tube-shaped gel at a temperature between about 600° C. and 110° C., using chlorine gas, removing remaining chlorine from the dried tube-shaped gel using He gas, and sintering the dried tube-shaped gel between 1300° C. and a glass fusion point.

* * * * *